United States Patent
Cho et al.

(10) Patent No.: US 6,604,012 B1
(45) Date of Patent: Aug. 5, 2003

(54) LOTS DISPATCHING METHOD FOR VARIABLY ARRANGING PROCESSING EQUIPMENT AND/OR PROCESSING CONDITIONS IN A SUCCEEDING PROCESS ACCORDING TO THE RESULTS OF A PRECEDING PROCESS AND APPARATUS FOR THE SAME

(75) Inventors: Dae-Sik Cho, Seoul (KR); Hee-Sun Chae, Kyunggi-do (KR); Seok-Hyun Kim, Seoul (KR); Seung-Hoon Tong, Seoul (KR); Tae-Yang Yoon, Kyunggi-do (KR); Doh-Soon Kwak, Kyunggi-do (KR); Hee-Se Kang, Kyunggi-do (KR); Yll-Seug Park, Kyunggi-do (KR); Jae-Seok Oh, Kyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 510 days.

(21) Appl. No.: 09/644,294

(22) Filed: Aug. 23, 2000

(30) Foreign Application Priority Data

Oct. 23, 1999 (KR) ......................................... 1999-46227

(51) Int. Cl.[7] ............................................... G06F 19/00
(52) U.S. Cl. ........................ 700/121; 700/109; 700/110; 702/84; 438/5
(58) Field of Search ................................. 700/108, 109, 700/110, 121, 112, 117; 716/4; 356/237.1; 438/5; 702/35, 81, 84, 117, 118, 182

(56) References Cited

U.S. PATENT DOCUMENTS

| | | | |
|---|---|---|---|
| 5,164,905 A | * | 11/1992 | Iwasaki et al. ............. 364/468 |
| 5,434,790 A | * | 7/1995 | Saka et al. .................. 364/468 |
| 5,761,064 A | * | 6/1998 | La et al. ................. 364/468.17 |
| 5,841,677 A | * | 11/1998 | Yang et al. ................. 364/569 |
| 5,862,055 A | * | 1/1999 | Chen et al. ............ 364/468.28 |
| 6,131,052 A | * | 10/2000 | Ban et al. ................... 700/121 |
| 6,161,054 A | * | 12/2000 | Rosenthal et al. .......... 700/121 |
| 6,202,037 B1 | * | 3/2001 | Hattori et al. .............. 702/182 |

* cited by examiner

Primary Examiner—Paul P. Gordon
(74) Attorney, Agent, or Firm—Volentine Francos, PLLC (57) ABSTRACT

A lot dispatching method and system for variably applying the most suitable processing equipment and/or processing condition in a succeeding process of a semiconductor manufacturing process, wherein the succeeding process is influenced by the result of a preceding process. A lot processed by the preceding process is dispatched to the succeeding processing equipment according to a systematic analysis result obtained from a relationship between a process result of the preceding process and an efficiency and the characteristics of a plurality of processing equipment in the succeeding process. A plurality of process conditions for the succeeding process corresponding to the performance of the preceding process is provided. A respective process condition has characteristics that minimize the difference in performance in the succeeding process from a desired or target performance. By systematically analyzing the quality of the lot waiting to be dispatched, the succeeding process is performed with the most suitable process condition.

27 Claims, 7 Drawing Sheets

LOTS DISPATCHING METHOD FOR VARIABLY ARRANGING PROCESSING EQUIPMENT AND/OR PROCESSING CONDITIONS IN A SUCCEEDING PROCESS ACCORDING TO THE RESULTS OF A PRECEDING PROCESS AND APPARATUS FOR THE SAME

CROSS-REFERENCES TO RELATED APPLICATIONS

The present application claims priority under 35 U.S.C. §119 to Korean Patent Application No. 1999-46227 filed on Oct. 23, 1999, which is hereby incorporated by reference in its entirety for all purposes.

BACKGROUND OF THE INVENTION

1. Field of the Invention

The present invention relates to a method for dispatching lots and an apparatus for the same, and more particularly to a method for dispatching lots in which processing equipment and/or processing conditions in a succeeding process are variably arranged according to the result of a preceding process, in a semiconductor manufacturing condition in which a plurality of processes are sequentially performed with respect to a same lot, and an apparatus for the same.

2. Description of the Related Art

Generally, semiconductor integrated circuit devices using a wafer are manufactured by a number of processes such as diffusion, photo, etching, oxidation, thin film, and metal processes. The order of performing the above-mentioned processes are determined by the kind of semiconductor integrated circuit device to be manufactured, and in a predetermined processing order, the results of the preceding process directly or indirectly influences the result of the succeeding process. For example, the accuracy of the photo process significantly affects the quality of a wafer obtained by the subsequent etching process.

Further, because semiconductor integrated circuit devices are mass-produced, a plurality of identical processing equipment simultaneously performing the same functions are commonly utilized in each manufacturing process.

In such manufacturing conditions of the semiconductor integrated circuit devices, when a wafer lot dispatches from a preceding process to a succeeding process, maintaining quality and production rate become an important factor to be considered. Especially, in the case when the result of a preceding process directly influences its succeeding process, a lot dispatching which uses to its highest degree the quality relationship between the preceding and succeeding processes contributes to the improvement of quality and production rate.

In view of the lot dispatching process, it is important to determine to which equipment among a plurality of equipment in a succeeding process a wafer lot should be dispatched, as some equipment in the succeeding process maintain the level of quality obtained in a preceding process while others deteriorate or improve the quality of the wafers. Further, even identical processing equipment lack consistency in their efficiency and performance, thus resulting in inconsistent processing quality. Especially, since wafers are generally finely processed in the semiconductor manufacturing processes, a minute difference in the efficiency and performance by the equipment in succeeding processes drastically influences the quality of wafers. Thus, dispatching a wafer lot to a succeeding process having a number of processing equipment is an important matter to be considered.

In relation to the lot dispatching, it should be further noted that the most suitable processing conditions should be applied for improving the quality and productivity of wafers in a succeeding process. Respective processes have their own processing conditions to be applied for processing the wafer lots. One processing condition is a combination of various processing condition elements such as pressure, temperature, and amount of the gas. As such, the quality of wafers obtained from a process is affected largely by suitability of the processing conditions applied in the process. Hence, the processing conditions of respective processes need to be most suitably applied to obtain best quality of the wafers.

Figure 1:
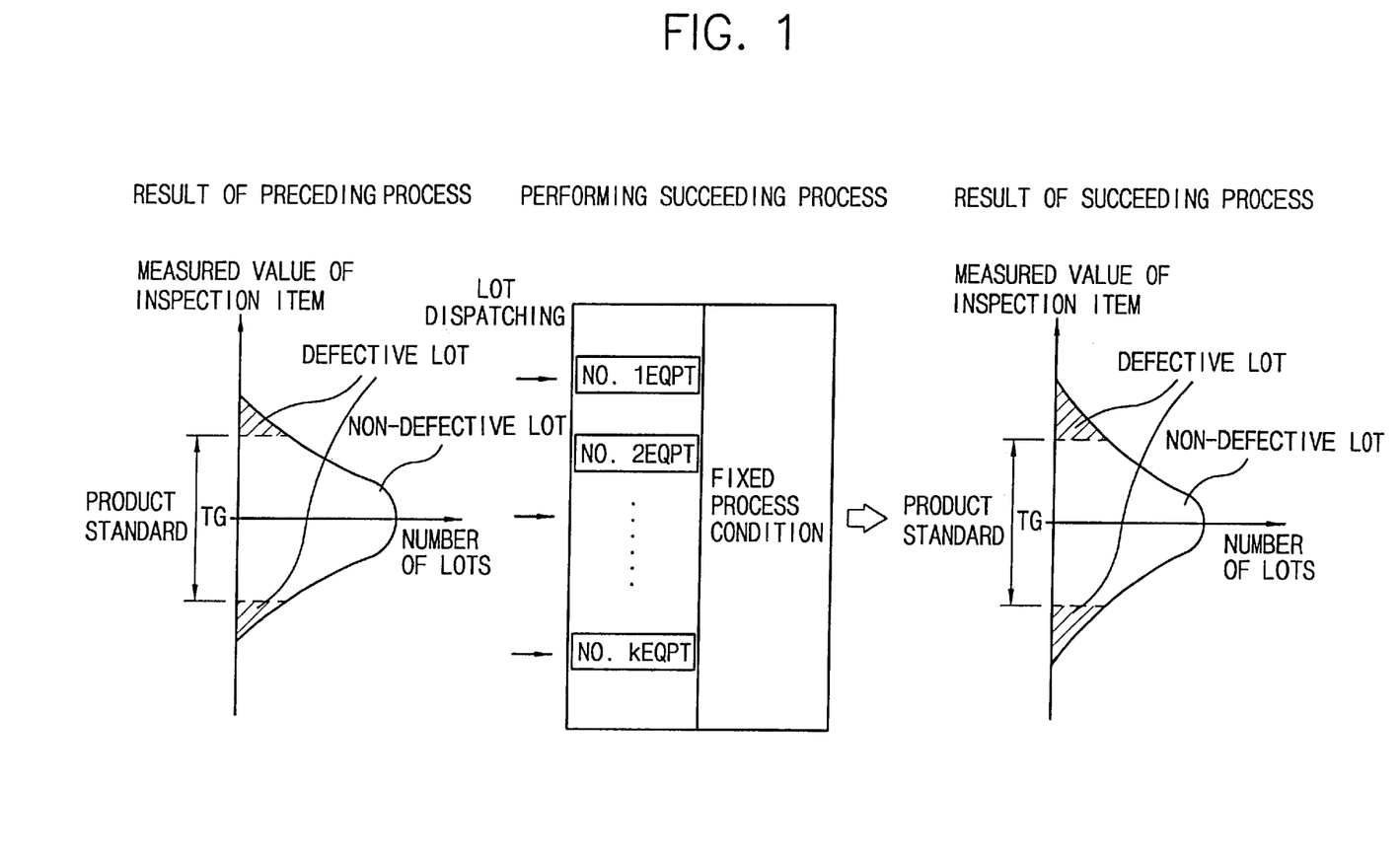
FIG. 1 is a view for explaining the concept of a conventional lot dispatching process.

FIG. 1 shows the concept of a lot dispatching commonly applied in a semiconductor manufacturing line. Such conventional lot dispatching is classified as fixed recipe. In such lot dispatching, lots waiting to be dispatched to a succeeding process from a preceding process are dispatched at random to one of the processing equipment designated from No. 1 to No. k without particularly considering the relationship between the results of the preceding process and/or the performance characteristics of the succeeding processing equipment. Such conventional random dispatching relies on the experience of engineers, which can not ensure consistently good quality. Further, in the conventional lot dispatching method, the processing error of the preceding process is not systemically compensated or reduced in the succeeding process.

Further, in determining processing conditions of a succeeding process, a single fixed processing condition which does not take into account the relationship between the result of the preceding process and the manufacturing conditions required in the succeeding process has been conventionally implemented. Also, in the conventional method, if it is evaluated that the existing processing condition deteriorates quality or productivity, an engineer analyzes the cause and makes appropriate changes in the processing condition. However, control of the processing conditions is not systematically accompanied in the conventional semiconductor manufacturing process.

As a result, because of the absence of the systematic analysis with respect to the relation between the results of the preceding process and the equipment and processing conditions of the succeeding process needed for improving quality and productivity, a most suitable lot dispatching method cannot be obtained. And, due to the efficiency limit of the processing equipment and the dispersion (including the accidental dispersion) of the input elements of the preceding and succeeding processes, it is difficult to obtain a predictable constant quality and productivity. Thus, defect rate of a wafer lot tends to be enlarged as the wafer lot is processed by succeeding processes. Further, conventionally, the selection of the processing equipment and the processing condition depended on the trial and error judgement of engineers, and frequent replacement of engineers or processing equipment resulted in more inconsistencies in the manufacturing process, as can be understood in view of FIG. 1. For example, when critical dimension (CD) is utilized to analyze qualities of wafer lots in a succeeding process, inferior quality caused by the succeeding process is determined to be greater than its preceding process.

A conventional technology related to a lot dispatching method is disclosed by U.S. Pat. No. 5,841,677. The patent discloses an optimization-based dispatching rule that can be used in manufacturing a semiconductor integrated circuit using equipment that needs a batch run and/or long processing time. According to the patent, when an expected waiting time which is needed for completing the preceding process with respect to a WIP lot is longer than the allowed waiting time, the lot is instantly processed in the succeeding process. In the opposite case, WIP lots are not dispatched until the allowed lots of the preceding process arrive, rather they are dispatched after the lots are merged together with the allowed lots to become a batch.

However, the patent only discloses the fact that the preceding processing equipment is efficiently used by the dispatching rule and that the waiting time should be minimized for dispatching, and does not refer to the systematic approach about the relationship between the result of the preceding process and the equipment and process conditions of the succeeding process in regard to maintaining consistent quality and productivity.

SUMMARY OF THE INVENTION

The present invention is therefore directed to a method of dispatching lots which substantially overcomes one or more of the problems due to the limitations and disadvantages of the related art.

It is a first object of the present invention to provide a lot dispatching method and system for dispatching a respective lot to a succeeding processing equipment most suitable for maintaining consistent quality, according to the systematic analytic result obtained by the relationship between the process result of a preceding process and the efficiencies and/or performance characteristics of a number of processing equipment of a succeeding process.

It is a second object of the present invention to provide a lot dispatching method and system for dispatching a respective lot processed in a preceding process to a succeeding process by applying a most suitable process condition, according to the systematic analysis obtained by the relationship between the process result of the preceding process and the process condition of the succeeding process.

It is a third object of the present invention to provide a lot dispatching method and system for dispatching a respective lot processed by the preceding process to a succeeding processing equipment most suitable for improving the quality of the lot by applying a succeeding process condition most suitable for quality improvement, according to the systematic analysis obtained by the relationship between the process result of the preceding process and the efficiency and/or performance characteristics of a number of equipments and the process condition of the succeeding process.

In order to achieve the first object of the present invention, there is provided a first lot dispatching method for dispatching a first lot which has been processed by a first processing equipment using a first process to a second process posterior to the first process in which a plurality of second processing equipment are operated in parallel. The first lot dispatching method includes the steps of: storing in a computer system measured data of an inspection item of second lots processed prior to the first lot by the first processing equipment and measured data of the inspection item of the second lots processed by one of the second processing equipment; evaluating process capabilities of the plurality of second processing equipment which compensate the deviations from a target value of the inspection item which are generated by the first processing equipment with respect to the first lot to the target value of the inspection item based on the accumulated measured data and determining a dispatching order of the first lot to be dispatched to the plurality of second processing equipment according to the evaluated process capabilities by the computer system; and dispatching the first lot to one of the second processing equipment available which is designated by the dispatching order.

The lot dispatching method may further comprise the steps of measuring respective inspection items of a lot respectively processed by the first and second processing equipment, and transferring the measured data obtained from the respective inspection items to the computer system and updating the existing data stored in the computer system.

The process capability of the second processing equipment is represented by a span of the inspection item that is calculated by the following equation, and dispatching order is determined by its absolute value.

$$Span = A - (R + TG)$$

where the parameter A is a measured value of the inspection item of the first lot, and the parameter TG is a target value of the inspection item of the second process, and the parameter R is a latest representative value of skews generated by each pair of processing equipment comprised of the first and second processing equipment, and the skews are deviation values between the measured value of the inspection item of the first process and the measured value of the inspection item of second process with respect to an identical lot. The representative value R is a mean value or an average value of the skews, and the order of dispatching is determined by the absolute values of span of which a relatively low absolute value of span is given priority.

For the implementation of the first lot dispatching method, there is provided a first lot dispatching system for dispatching a first lot that has been processed by a first process to a second process in a semiconductor integrated circuit device manufacturing process having at least a first process and a second process posterior to the first process. The dispatching system includes a first stage having at least more than one same equipment for performing the first process for a second lot; a second stage having a plurality of the same equipment for performing the second process for the second lot; a measuring unit for measuring an inspection item with respect to a lot processed by the first and second processes; and a controller. The controller stores the measured data transferred from the measuring unit, and evaluates a process capability of each of the second processing equipment which compensates a deviation from a target value of the inspection item generated by the first processing equipment with respect to the first lot. Based on the evaluated process capability, the controller determines a dispatching order of the first lot to be dispatched to the second processing equipment and controls dispatching process of the first lot to one of the second processing equipment available which is designated by the dispatching order.

According to this first aspect of the present invention, respective lots having been processed by the preceding process can be dispatched to a second processing equipment by which deviations of the respective lots from the target value of the inspection item can be minimized. This is a method such that every processing equipment of a process can be most effectively used. As a result, a processing capacity, a product quality and yield can be improved markedly.

Further, in order to achieve the second object of the present invention, there is provided a second lot dispatching method for dispatching current lots in a semiconductor integrated circuit device manufacturing process having at least a first process and a second process posterior to the first process. The second lot dispatching method includes the steps of: classifying values of an inspection item into several groups according to their magnitude and preparing a plurality of process conditions for the second process each of which corresponds to each of the several groups, in which the process conditions have compensating characteristics to minimize the difference between a standard value of a group corresponding to the process condition and a target value of the inspection item; measuring the inspection item with respect to the current lots after the first process; selecting one process condition corresponding to a measured value obtained in the measuring step among the plurality of process conditions; and dispatching the current lots to the second process with setting of the second process to a selected process condition.

The second lot dispatching method may further include the step of selecting an object lot of which a measured value of the inspection item satisfies a product standard but does not satisfy a control standard from current lots processed by the first process for being applied to the lot dispatching method, in which the product standard is an external criteria for judging whether a lot is defective or non-defective in a product quality and the control standard is set more strictly than the product standard.

Introducing of the plurality of process conditions is realized by the steps of: selecting one or more process condition elements which influence process result with respect to the inspection item among process condition elements of the second process; determining a function for regulating the values of the inspection item, the selected process condition elements being parameters of the function; determining values of the parameters for compensating the differences corresponding to respective groups; and setting the values of the parameters as values of the process condition elements. Preferably, the process condition element, which becomes a parameter of the function, is selected from a plurality of process condition elements by which dispersion characteristics of the measured value with respect to the inspection item is obtained within a predetermined reference range. It is preferable that the function is substantially linear with respect to the parameter.

Further, for the implementation of the second lot dispatching method, there is provided a second lot dispatching system for dispatching a current lot which has been processed by a first process to a second process in a semiconductor integrated circuit device manufacturing process having the first process and the second process performed after the first process. The second lot dispatching system includes a measuring unit for measuring an inspection item of the current lot and a second processing equipment for performing the second process for the current lot, and a controller. The controller classifies values of the inspection item into a plurality of groups according to their magnitudes, and prepares a plurality of process conditions corresponding to the groups for the second process. The process conditions have compensating characteristics which minimize a difference between a standard value of a group corresponding to the process condition and a tar get value of the inspection item. The controller further selects a process condition among the process conditions based on a magnitude of the measured data transferred from the measuring unit, and dispatches the current lot to the second process with setting of the second process to the selected process condition.

According to the above-mentioned second aspect of the present invention, a plurality of processing recipes are flexibly and optimally applied in the succeeding process based on the process quality of the preceding process. An optimal processing recipe can reduce the deviation between a reference value of a respective group and a target value of the inspection item, which results in increase of processing capacity and various advantages such as reduction of cost and time and increase of quality and yield.

In order to achieve the third object of the present invention, there is provided a third lot dispatching method. This method is obtained from integration of the first and second lot dispatching methods. For dispatching a current lot which has been processed by a first processing equipment by a first process to a second process posterior to the first process in which a plurality of second processing equipment are simultaneously operated, the third lot dispatching method includes the steps of: measuring an inspection item of lots processed by the first processing equipment and an inspection item of lots processed by a second processing equipment; classifying values of the inspection item into several groups according to their magnitude and preparing a plurality of process conditions for the second process, in which the process conditions have compensating characteristics which minimize a difference between a standard value of the group corresponding to each of the process conditions and a target value of the inspection item; determining whether the measured value of the inspection item of the current lot is a first case in which the measured value satisfies a product standard but does not satisfy a control standard set more strictly than the product standard or a second case in which the measured value satisfies the control standard; selecting one process condition among the plurality of the process conditions based on the measured value of the inspection item of the current lot if the current lot is determined to be the first case, and dispatching the current lot to the second process while setting the second process to the selected process condition; and dispatching the current lot to a second processing equipment which compensates deviations from the target value of the inspection item generated by the first processing equipment with respect to the current lot to a smallest value if the current lot is determined to be the second case.

There is also provided a third dispatching system suitable for implementing the third lot dispatching method which serves to dispatch a first lot which has been processed by a first process to a second process posterior to the first process in a semiconductor integrated circuit device manufacturing process having the first process and the second process. The third lot dispatching system has a first stage having at least one same first processing equipment for performing the first process on a second lot by using the first processing equipment; a second stage having a plurality of the same second processing equipment for performing the second process on the second lots; a measuring unit for measuring the inspection item of lots processed by the first and second processes; and a controller.

The controller stores measured data received from the measuring unit, classifies values of the inspection item into a plurality of groups according to their magnitude, and prepares a plurality of process conditions corresponding to the groups for the second process. Especially, the process condition has compensating characteristics that minimize the difference between the standard value of the groups corresponding to the process condition and the target value of the inspection item. Further, the controller judges whether the measured value of the inspection item of the first lot is a first case in which the measured value satisfies the product standard but does not satisfy the control standard set more strictly than the product standard and a second case in which the measured value satisfies the control standard. When the first lot is judged to be in the second case, the controller evaluates the process capabilities of the second processing equipment which compensate the deviation from the target value generated by the first processing equipment with respect to the first lot to the target value of the inspection item according to the stored measured data, determines the dispatching order of the first lot with respect to the plurality of second processing equipment according to the evaluated process capability, and dispatches the first lot to one of the second processing equipment available which is designated by the dispatching order. Further, when the first lot is judged to be in the first case, the controller selects one process condition from the plurality of process conditions based on the magnitude of the measured data transferred from the measuring unit and dispatches the first lot to the second process with setting of the second process to the selected process condition.

According to the third aspect of the present invention, when a lot processed by the preceding process has a small deviation between the measured value of the inspection item and the target value, optimizing of the process equipment of the succeeding process is applied to reduce the deviation of the lot. Further, when the deviation of the lot has a large value, optimizing of the process recipe of the succeeding process is applied to reduce the large deviation. Therefore, in spite of the magnitude of the deviation value, the third aspect of the present invention can always urge the quality of the lot to move toward the target quality process by process.

These various aspects of the present invention can be applied to overall processes of the semiconductor device-manufacturing factory, which will result in a remarkable increase of a whole production capacity of the factory.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Hereinafter, preferred embodiments of the present invention will be explained in detail with reference to the attached drawings. In the figures attached showing the preferred embodiments of the present invention, a preceding process 200 is designated as a photo process, and a succeeding process 300 is designated as an etching process, as examples of the embodiments for explaining the present invention. In manufacturing a semiconductor, the combination of the preceding and succeeding processes can be various. Therefore, the embodiment of the present invention can be applied to various combinations of the preceding and succeeding processes in the semiconductor manufacturing process. It is preferable that the present invention is applied to a semiconductor manufacturing process in which the succeeding process is influenced by results of the preceding process.

(1) A First Embodiment—Processing Equipment Arrange Control System: PEACONS

Figure 2:
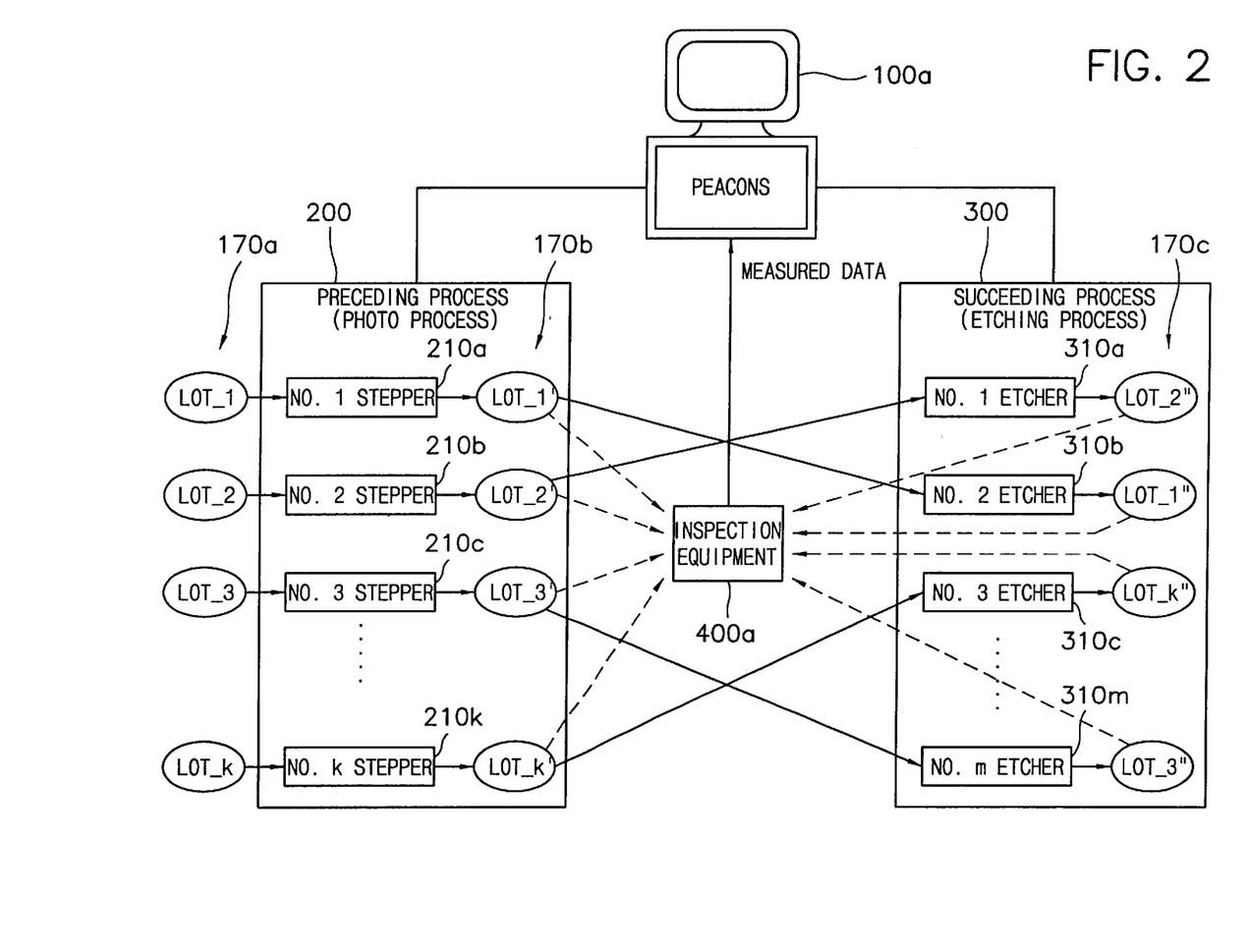
FIG. 2 is a view for explaining a concept of a lot dispatching system (PEACONS) for dispatching lots to a most suitable succeeding processing equipment by a result of a preceding process, according to a first preferred embodiment of the present invention.

FIG. 2 is a view of a lot dispatching system according to the first embodiment of the present invention for dispatching lots to a most suitable succeeding processing equipment according to the result of a preceding process.

The system (PEACONS) includes at least one equipment in the preceding process, for example, steppers 210a, 210b, 210c, . . . , and 210k, and a plurality of equipment for the succeeding process, for example, etchers 310a, 310b, 310c, . . . , and 310m. The system includes an inspection equipment 400a for measuring lots 170b and 170c processed by the preceding and succeeding processes with respect to the inspection items which are set in the respective processes, and a computer system 100a for controlling dispatching orders with respect to the succeeding process equipment 310a, 310b, 310c, . . . , and 310m for the lots 170b waiting to be dispatched to the succeeding process 300 according to measured data provided from the inspection equipment 400a and other data. In the computer system 100a, a program named auto-dispatching system-I (ADS-1) for automatically controlling the dispatching of the lots and basic data is stored.

Here, the inspection items set in the respective process are such as critical dimension (CD), line width, thickness of thin film, reflection rate, and insulation characteristics or the like. The inspection items can be one or more. Hereinafter, the inspection item is designated to be CD throughout the invention as an example for a clear understanding of the invention.

Figure 3:
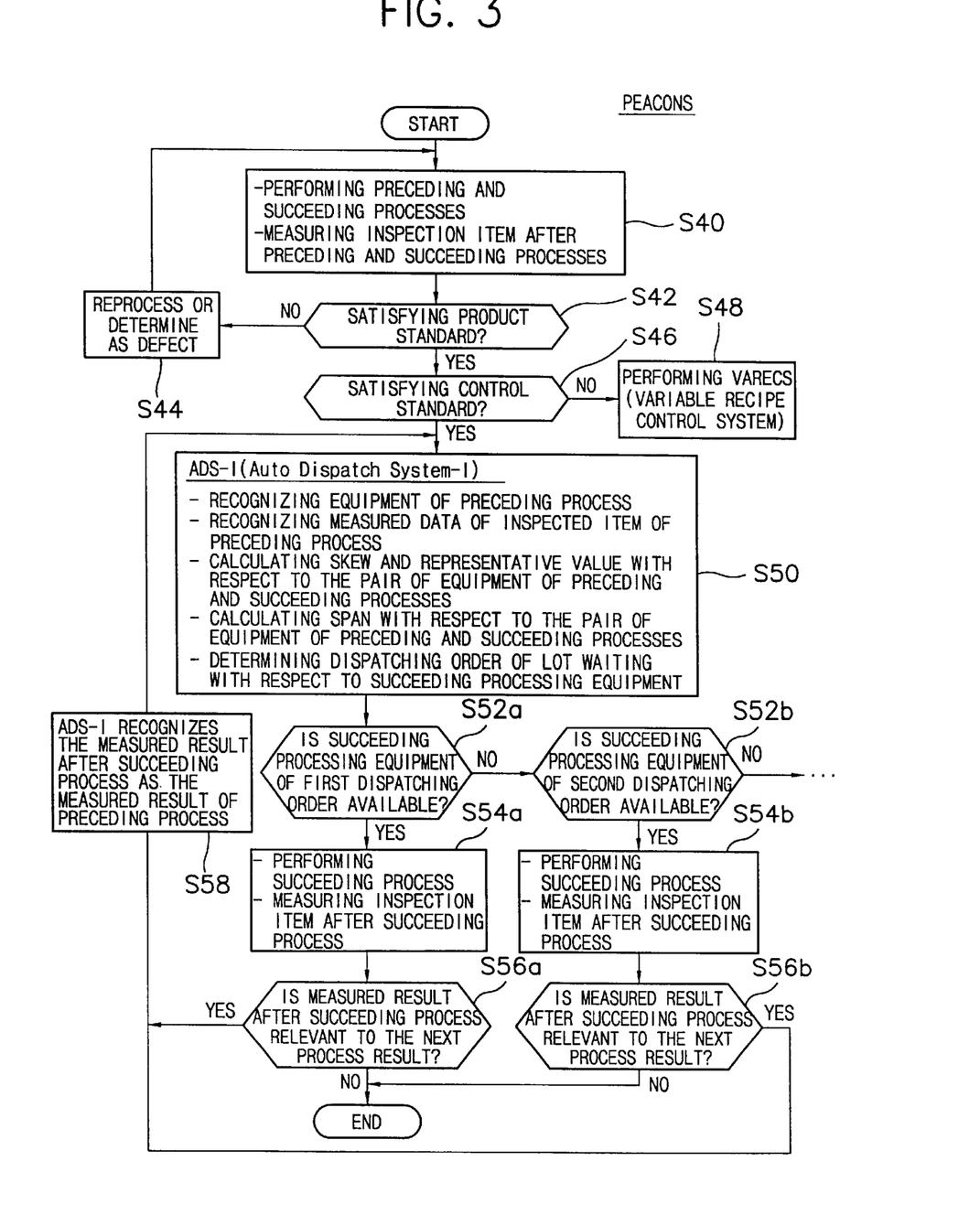
FIG. 3 is a flow chart for dispatching lots to the most suitable processing equipment by the result of the preceding process according to the lot dispatching system (PEACONS) of FIG. 2.

FIG. 3 is a flow chart for explaining the basic function of a lot dispatching method performed by using the lot dispatching system (PEACONS) of FIG. 2.

Referring to FIGS. 2 and 3, when a plurality of processing equipment, i.e., steppers are simultaneously operated in the preceding process, i.e., the photo process 200, the wafer lots 170a are simultaneously processed in the No. 1 to No. k steppers. Wafer samples from lots 170b processed by the photo process 200 are inspected by inspection equipment 400a with respect to inspection item CD. The inspection equipment 400a then transfers the measured in real-time results of the lots to the computer system 100a (Step S40). The measured results of the inspection equipment 400a include the identification numbers of the lots, the identification numbers of the steppers, measured CD data, or the like. For example, data such as LOT__2350 as the identification number of the lot LOT__1' processed by the stepper No. 1 210a, #STEPPER__1 as the identification number of the stepper, 0.25 µm as the measured CD data, or the like is transferred to the computer system and stored in a storage unit (not shown) in the computer system.

The lots 170b, which have been processed by the photo process 200 and inspected by the inspection equipment 400a, now wait to be dispatched to the succeeding process, i.e., etching process. In order to dispatch each lot 170b to their respective processing equipment in the succeeding process, the computer system 100a systematically analyzes the transferred data. The object of the analysis by the computer system 100a is to determine which etching equipment will result in a CD value close to a desired target value. As a result, a dispatching order of the lots 170b to the respective etching equipment, with respect to the respective lot, is determined (Step S50). And, the lots 170b are dispatched to their respective etching equipment in order as designated by the dispatching order (Steps S52a, S52b etc.). Detailed explanation as for this will be given later.

Photo process 200 and etching process 300 are generally performed simultaneously with respect to different lots and CD measurement of lots 170c, which have been processed by the etching process 300, is performed by the CD inspection equipment 400a. The CD measurement may be performed for the wafers sampled from the respective lots. And, the result of the measurement, i.e., the identification number of the lot, the identification number of the etcher, measured CD data, or the like are directly transferred to the computer system 100a. For example, data such as LOT__2350 as the identification number of the lot LOT__1" processed by the etcher No. 2 310b, #ETCHER__2 as the identification number of the etcher, 0.26 µm as the measured CD data, or the like is transferred to the computer system 100a (Step S40).

Repeating the above-mentioned processes, the computer system 100a stores the required data in the storage. The stored data is used by the computer system 100a as a basic data for evaluating the processing capability of the etching equipment in the succeeding process and the dispatching order of the lots 170b is determined by the evaluated processing capability (Step S50).

Hereinafter, the above-mentioned concept of the first embodiment will be explained with reference to Table 1. Three steppers and three etchers are assumed as an example in Table 1 (the assumption is also applied to FIG. 2), and no restriction is placed on the first embodiment except that a plurality of etchers should be included.

In the computer system 100a, information about the kinds of inspection items, the processing equipment (for example, the identification numbers of the processing equipment), the target values TG of the inspection items, and the inspection equipment or the like are stored. The information may depend on computer systems made by different manufacturers. Further, the inspection items can differ for each process even though the equipment has been made by a same company, and process environments can be changed over time. Thus, the above-mentioned information needs to be updated as occasion demands.

TABLE 1

| | Preceding process | | Succeeding process | Skew (A – B) | | |
|---|---|---|---|---|---|---|
| Stepper | Measured value (A) | Etcher | Measured value (B) | (n-4), (n-3) (n-2), (n-1) | Representative value | Span |
| No. 1 | $a_{n-12}, a_{n-8},$ $a_{n-7}, a_{n-4}$ | No. 1 | $b_{n-9}, b_{n-8},$ $b_{n-7}, b_{n-2}$ | $(a_{n-12} - b_{n-9}), (a_{n-8} - b_{n-8}),$ $(a_{n-7} - b_{n-7}), (a_{n-4} - b_{n-2})$ | $(a_{n-4} - b_{n-2})$ | $S_1 = a_n - [(a_{n-4} - b_{n-2}) - TG]$ |
| | $a_{n-9}, a_{n-6},$ $a_{n-3}, a_{n-2}$ | No. 2 | $b_{n-12}, b_{n-11},$ $b_{n-6}, b_{n-1}$ | $(a_{n-9} - b_{n-12}), (a_{n-6} - b_{n-11}),$ $(a_{n-3} - b_{n-6}), (a_{n-2} - b_{n-1})$ | $(a_{n-6} - b_{n-11})$ | $S_2 = a_n - [(a_{n-6} - b_{n-11}) - TG]$ |
| | $a_{n-11}, a_{n-10},$ $a_{n-5}, a_{n-1}$ | No. 3 | $b_{n-10}, b_{n-5},$ $b_{n-4}, b_{n-3}$ | $(a_{n-11} - b_{n-10}), (a_{n-10} - b_{n-5}), (a_{n-11} - b_{n-10})$ $(a_{n-5} - b_{n-4}), (a_{n-1} - b_{n-3})$ | | $S_3 = a_n - [(a_{n-11} - b_{n-10}) - TG]$ |
| No. 2 | $c_{n-11}, c_{n-8},$ $c_{n-7}, c_{n-2}$ | No. 1 | $d_{n-9}, d_{n-8},$ $d_{n-6}, d_{n-2}$ | $(c_{n-11} - d_{n-9}), (c_{n-8} - d_{n-8}),$ $(c_{n-7} - d_{n-6}), (c_{n-2} - d_{n-2})$ | $(c_{n-11} - d_{n-9})$ | $S_4 = c_n - [(c_{n-11} - d_{n-9}) - TG]$ |
| | $c_{n-9}, c_{n-6},$ $c_{n-3}, c_{n-4}$ | No. 2 | $d_{n-12}, d_{n-10},$ $d_{n-6}, d_{n-1}$ | $(c_{n-9} - d_{n-12}), (c_{n-6} - d_{n-10}),$ $(c_{n-3} - d_{n-6}), (c_{n-4} - d_{n-1})$ | $(c_{n-3} - d_{n-6})$ | $S_5 = c_n - [(c_{n-3} - d_{n-6}) - TG]$ |
| | $c_{n-12}, c_{n-10},$ $c_{n-5}, c_{n-1}$ | No. 3 | $d_{n-11}, d_{n-7},$ $d_{n-4}, d_{n-3}$ | $(c_{n-12} - d_{n-11}), (c_{n-10} - d_{n-7}), (c_{n-1} - d_{n-3})$ $(c_{n-5} - d_{n-4}), (c_{n-1} - d_{n-3})$ | | $S_6 = c_n - [(c_{n-1} - d_{n-3}) - TG]$ |
| No. 3 | $e_{n-12}, e_{n-8},$ $e_{n-9}, e_{n-4}$ | No. 1 | $f_{n-10}, f_{n-8},$ $f_{n-7}, f_{n-1}$ | $(e_{n-12} - f_{n-10}), (e_{n-8} - f_{n-8}),$ $(e_{n-9} - f_{n-7}), (e_{n-4} - f_{n-1})$ | $(e_{n-4} - f_{n-1})$ | $S_7 = e_n - [(e_{n-4} - f_{n-1}) - TG]$ |
| | $e_{n-10}, e_{n-6},$ $e_{n-3}, e_{n-2}$ | No. 2 | $f_{n-12}, f_{n-11},$ $f_{n-6}, f_{n-2}$ | $(e_{n-10} - f_{n-12}), (e_{n-6} - f_{n-11}),$ $(e_{n-3} - f_{n-6}), (e_{n-2} - f_{n-2})$ | $(e_{n-2} - f_{n-2})$ | $S_8 = e_n - [(e_{n-2} - f_{n-2}) - TG]$ |
| | $e_{n-11}, e_{n-7},$ $e_{n-5}, e_{n-1}$ | No. 3 | $f_{n-9}, f_{n-5},$ $f_{n-4}, f_{n-3}$ | $(e_{n-11} - f_{n-9}), (e_{n-7} - f_{n-5}),$ $(e_{n-5} - f_{n-4}), (e_{n-1} - f_{n-3})$ | $(e_{n-7} - f_{n-5})$ | $S_9 = e_n - [(e_{n-7} - f_{n-5}) - TG]$ | etching process 300 is performed by several equipment 310a, 310b, 310c, . . . , 310m. The first embodiment of the present invention is applied to a process environment in which the succeeding process is performed in parallel operation by several equipment.

Assuming that the auto dispatching system-I ADS-I of the computer system 100a is being operated, and the measured result of the lot LOT__1' processed by the No. 1 stepper is transferred from the CD inspection equipment 400a to the computer system 100a, the computer system 100a stores the transferred data in the storage and recognizes the lot LOT_1' processed by the No. 1 stepper and the measured CD value $a_n$ of the lot LOT_1', from the data.

The computer system 100a calculates skews with respect to the equipment of the photo and etching processes by using the measured CD values of the lots that have recently been processed by the No. 1 stepper 210a. Here, the skews are calculated by the following equation (1). Even when the inspection item is not CD, for example, the line width, skew of the line width measured values can also be calculated by the following equation (1).

$$CD\ skew = CD\_P - CD\_E \qquad (1)$$

where variable CD_P is a measured CD value after photo process and the variable CD_E is a measured CD value after etching process. The CD skews of the process equipment are calculated as follows. In the preceding process column of Table 1, $a_{n-1}$, $a_{n-2}$, $a_{n-3}$, $a_{n-4}$, $a_{n-5}$, $a_{n-6}$, $a_{n-7}$, $a_{n-8}$, $a_{n-9}$, $a_{n-10}$, $a_{n-11}$, and $a_{n-12}$ indicate measured CD values of the recent ten lots which have been processed prior to the lot LOT_1' by the No. 1 stepper 210a, four lots corresponding to the measured CD values $a_{n-12}$, $a_{n-8}$, $a_{n-7}$, and $a_{n-4}$ are dispatched to the No. 1 etcher 310a to be etched, and the measured CD values of the lots after the etching processes are $b_{n-9}$, $b_{n-8}$, $b_{7-7}$, and $b_{n-2}$. Similarly, four lots corresponding to the measured CD values $a_{n-11}$, $a_{n-10}$, $a_{n-5}$, and $a_{n-1}$ are dispatched to the No. 3 etcher 310c to be etched, and measured CD values of the lots after the etching processes are $b_{n-10}$, $b_{n-5}$, $b_{n-4}$, and $b_{n-3}$.

The computer system 100a reads the measured data stored in the storage, and as described in the skew column of Table 1, calculates the CD skews with respect to pairs of equipment by using the equation (1). Here, the pairs of equipment mean, for example, No. 1 stepper 210a and No. 1 etcher 310a, No. 1 stepper 210a and No. 2 etcher 310b, and No. 1 stepper 210a and No. 3 etcher 310c, with respect to the No. 1 stepper 210a. Similarly, the pairs of equipment with respect to the No. 3 stepper 210c are No. 3 stepper 210c and No. 1 etcher 310a, No. 3 stepper 210c and No. 2 etcher 310b, and No. 3 stepper 210c and No. 3 etcher 310c. The calculated CD skews are stored in the storage of the computer system.

The computer system calculates the CD skews with respect to the all pairs of equipment of the photo and etching process 200 and 300.

Meanwhile, the CD skews calculated with respect to the pairs of equipment can be evaluated with respect to values that represent the process characteristics or capabilities of the stepper and the etcher. Each measured value after the photo and etching process 200 and 300 which has been used to calculate the CD skews relates to an identical lot. For example, when a lot processed by the No. 1 stepper 210a is etched by the No. 1 etcher 310a, the CD skew shows how the process result with respect to the CD of the No. 1 stepper 210a is changed by the No. 1 etcher 310a. Therefore, the CD skew about No. 1 stepper 210a and No. 1 Etcher 310a represents the process capability or characteristics of No. 1 etcher 310a with respect to the No. 1 stepper 210a. Moreover, since recent measured values are used in calculating the CD skews, the evaluation about the process capability is also recent.

Thereafter, the computer system 100a selects one representative value from the latest four CD skews calculated with respect to the pair of equipment. To exclude any inaccuracies from the accidental dispersion of the measured CD values, a middle value of the four CD skew values is preferably selected as a representative value. But, as a standard for determining the representative value, an average value of the four CD skews can be used instead of the middle value, or an average value of the CD skews that are within a range can be used as the representative value. When the dispersion of the measured CD values of the lots is large, selecting the middle value as the representative value is better than selecting the average value.

Once the skew representative value is selected, span is calculated with respect to the pair of equipment by using the following equation (2). The span shows how much deviation the process capability of the pair of the processing equipment has with respect to the target value of the inspection item. Therefore, the CD span can be an index for anticipating the process capability of the pair of the processing equipment with respect to the CD target value TG.

The values $S_1$ to $S_9$ that are described in the span column of Table 1 represents the span of the respective pair of equipment which are calculated by the following equation (2).

$$\text{Span} = A - (R + TG) \qquad (2)$$

where the variable A is measured CD values of the lots 170b waiting to be dispatched to the etching process, and is indicated by $a_n$, $c_n$, $e_n$ in Table 1. The variable TG is a target CD value, and R is a representative value of the skews. In Table 1, the number of elements of the skews for selecting a representative value is limited to 4 for an example.

Next, the computer system 100a sorts the succeeding processing equipment, i.e., the etchers, based on the absolute values of the calculated span values. The sorting is performed with respect to the steppers, and therefore the sorting range with respect to the lot LOT_1' processed by the No. 1 stepper 210a is $S_1$, $S_2$, and $S_3$. The sorting is performed in ascending powers. Similarly, the dispatching order with respect to three etchers is determined for the lots LOT_2' and LOT_3' that are respectively processed by the Nos. 2 and 3 steppers.

After the dispatching order of the lots LOT_1', LOT_2', and LOT_3' is determined, the lots LOT_1', LOT_2', and LOT_3' are dispatched to the succeeding processes according to the dispatching order.

In dispatching the lots, the computer system 100a dispatches the lots to the succeeding processing equipment according to the dispatching order. For example, when the relationship of the spans of the lot LOT_1 is $|S_3|<|S_1|<|S_2|$, the dispatching order with respect to the three etchers of the current lot LOT_1' is No. 3 etcher, No. 1 etcher, and then No. 2 etcher. Therefore, the succeeding processing equipment to which the current lot LOT_1' is to be dispatched is No. 3 etcher 310c. If the No. 3 etcher is available, the current lot LOT_1' is dispatched to No. 3 etcher 310c (Step S52a). But, if the No. 3 etcher is not available, the availability of the No. 1 etcher is determined. If the No. 1 etcher is available, the lot is dispatched to No. 1 etcher. If the No. 1 etcher is not available, the lot is dispatched to No. 2 etcher 310b.

Similarly, when the relationship of the spans of the lot LOT_3 is $|S_7|<|S_8|<|S_9|$, the current lot LOT_3' is dispatched to No. 1 etcher 310a if No. 1 etcher is available. If No. 1 etcher is not available, the lot is dispatched in the order of No. 2 etcher 310b and No. 3 etcher 310c (Step S52b).

The respective equipment of the etching process 300 etches the dispatched lots in the above-mentioned order. After etching, the process result for CD is measured by the inspection equipment 400a for a sample wafer from the respective lots. The elements measured after etching can include the line width, reflection degree, or the like. The results obtained from the measurement are provided to the computer system 100*a* (Steps S54*a*, S54*b*, . . . ). Here, the etching process that is a succeeding process to the photo process can also be a preceding process for its succeeding process.

Thereafter, whether the result of the etching process 300 influences the result of its succeeding process (not shown) is determined (Steps S56*a*, S56*b*, . . . ). Assuming that the impurity diffusion process is performed after the etching process, whether the result of the etching process influences the result of the impurity diffusion process is determined. The inspection item can be other items instead of CD.

If the process quality of the etching process influences the succeeding process of the etching process 300, the results measured for the etching process are recognized by the computer system 100*a* as the measured result of the preceding process (Step S58).

As a result, since the etching process becomes a preceding process and the impurity diffusion process becomes a succeeding process, the dispatching of the lots 170*c* after the etching process to the impurity diffusion process equipment is controlled similarly by the dispatching controlling method which has been described for the photo-etching processes.

Meanwhile, steps S42, S44, and S46 for sorting the lots to which the dispatching method according to the first embodiment of the present invention can be applied are additionally included after the Step 40.

The computer system determines whether the results of measured CD for the lots 170*b* which have been processed by the etching process 200 satisfies the product standard (or external quality standard) which is a standard for determining unsatisfactory defects in the product (Step S42). The lots that do not satisfy the product standard are either reprocessed in the preceding process if reprocessing of the lots is allowed or discarded if not.

The lots which satisfy the product standard can be applied with the dispatching method according to the first embodiment of the present invention, but the applicability of the dispatching method should preferably be more strict than satisfying the product standard. Generally, in a semiconductor manufacturing process, defects in succeeding processes are anticipated in advance. As such, products are subjected to a control standard (or internal quality standard) which is stricter than the product standard. For example, the control standard can be understood as a quality control standard set by a manufacturer for one or more inspection items, so that it may be ensured that product quality meets the product standard. The product standard can be understood as a formal quality standard as accepted by the manufacturer and the buyer of the product. Thus, the usual policy of the manufacturer is to set the control standard more strictly than the product standard, to thus satisfy expectations of the buyer. The degree of strictness regarding setting of the control standard by the manufacturer can be determined based on an average processing error in processes subsequent to a preceding process. Therefore, it is preferable that, after sorting the lots which satisfy the control standard, the lots pass the step S50 and the succeeding processes. Further, the second embodiment of the present invention can be applied to the lots which satisfy the product standard but do not satisfy the control standard.

(2) A Second Embodiment—Variable Recipe Control System: VARECS

Figure 4:
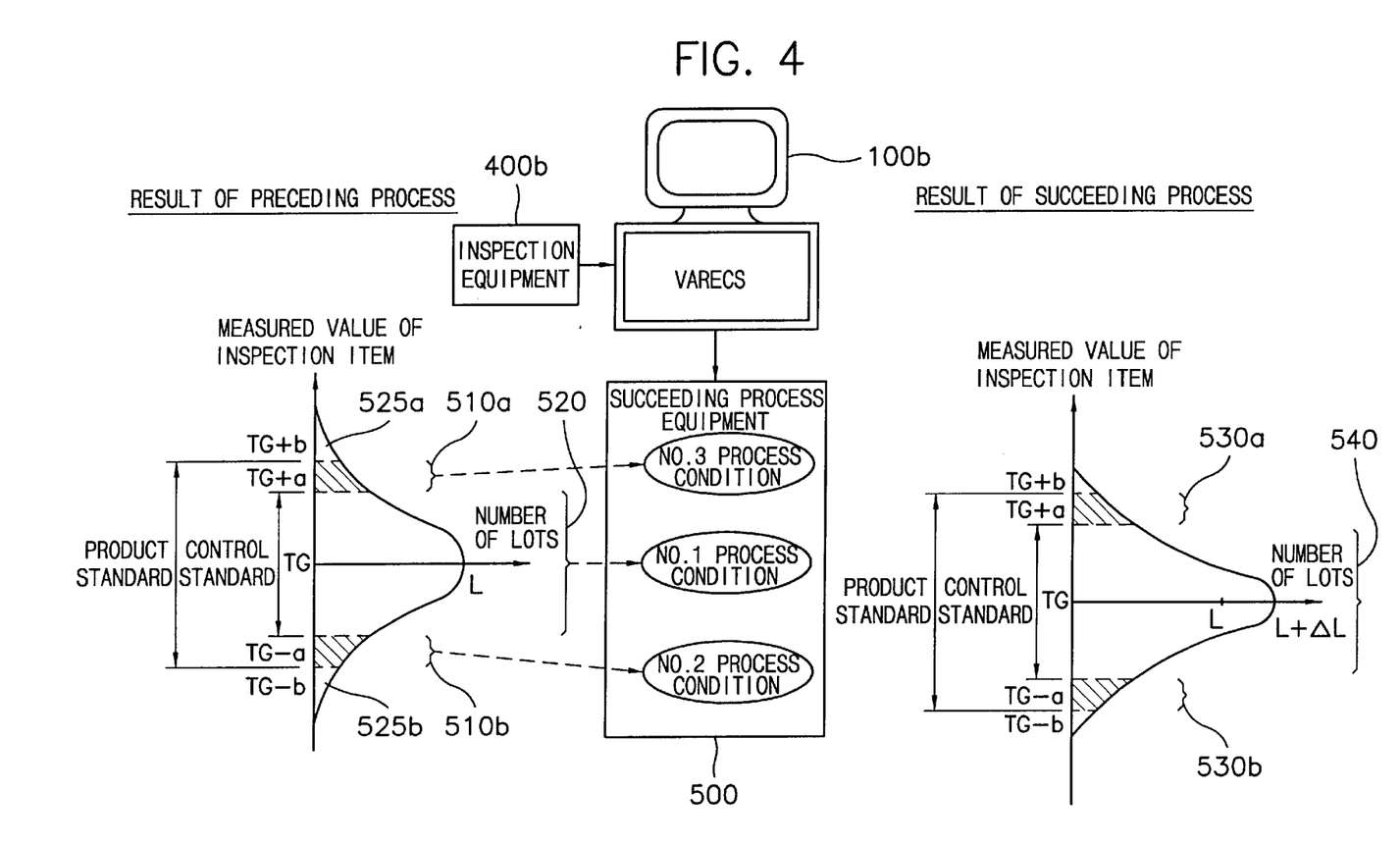
FIG. 4 is a view for explaining a concept of a lot dispatching system (VARECS) for dispatching lots by a result of a preceding process by applying a most suitable succeeding process condition, according to a second preferred embodiment of the present invention.

The variable recipe control system for implementing the second embodiment of the present invention as illustrated in FIG. 4 includes an inspection equipment 400*b* for measuring inspection items of the lots to be dispatched, wherein at least one processing equipment for performing a succeeding process for the lots dispatched, and a computer system 100*b* for most suitably setting a process condition which is applied to the succeeding process according to the process result of the preceding process, are included. In the computer system 100*b*, a control program named auto-dispatching system-II (ADS-II) for most suitably setting the process condition of the succeeding process is stored. Similar to the first embodiment, the preceding process is a photo process, the succeeding process is an etching process, and the inspection item is CD.

According to the second embodiment, according to the process result of the lots which have been processed by the photo process, a process condition that can obtain the quality of the lot which is close to a CD target value TG is applied in the succeeding process. Therefore, the process conditions in the succeeding process are not fixed, but vary according to the result of the preceding process. Hereinafter, the concept of VARECS will be explained more in detail.

Firstly, the function f( ) for determining a plurality of process conditions for improving the process capability of the etching process is established. The process result of the etching process is determined by the process result of the photo process and the process condition applied in the etching process. The process result of the etching process can be expressed by the function f( ).

$$ACI = f(ADI, EP) \tag{3}$$

where the variable ACI is a measured CD value after the etching process, the variable ADI is a measured CD value after the photo process, and the variable EP is an element for determining the process condition of the etching process.

Since the value of ADI is the already fixed during the etching process, the process condition element EP of the etching process varies ACI. Then, change in the process element Ep varies the value of ACI. There are various kinds of process condition elements of the etching process. Pressure in a processing chamber, internal temperature of the processing chamber, amount of etching gas, power, or the like can be exemplified as the process condition elements of the etching process. The process condition elements of the etching process can influence ACI differently, thus the elements of the process condition are selected by experiment. It should be considered that in selecting the main factor, the variation of the main factor should not worsen the dispersion characteristics of the measured CD value. Bad dispersion characteristics of CD are attributed by the measured CD values of a lot having increased defects. Assume that the main factors for regulating the ACI value are determined to be a pressure P of the processing chamber, an amount G of etching gas, and electric power E. The main factors can be different in each process. ACI or skew of CD (ACI can be represented by CD skew) is a function in which the main factors are parameters, and can be expressed by the following function F( ).

$$CD\ Skew = F(G, P, E) \tag{4}$$

The function F( ) which varies the average value of the CD skew is selected by experiments in which the pressure P in the chamber, the amount G of the etching gas, and the electric power E are varied and by the recursive analysis method from the experiment result. The function can have one of the three main factors as its parameter, or can have all three main factors as parameters. And, it is preferable that the average value of the CD skew should be linearly varied with respect to the variations of the parameter value. The variation of the CD skew can be easily expected by the linear characteristics of the function value with respect to the parameter. And, even when the expected value is different from the result of the actual process, the cause analysis can be easily performed by the linear characteristics.

Assume that the function obtained by the experiments and the recursive analysis method is equation (5). The function also can be one of the functions obtained by experiments, analysis, and verification. The function means that varying the electric power E and the amount G of gas can regulate the average value of the CD skews:

$$CD \text{ Skew } (E, G) = a + bE^2 + cG^2 \quad (5),$$

where a, b, and c are constants.

Figure 7:
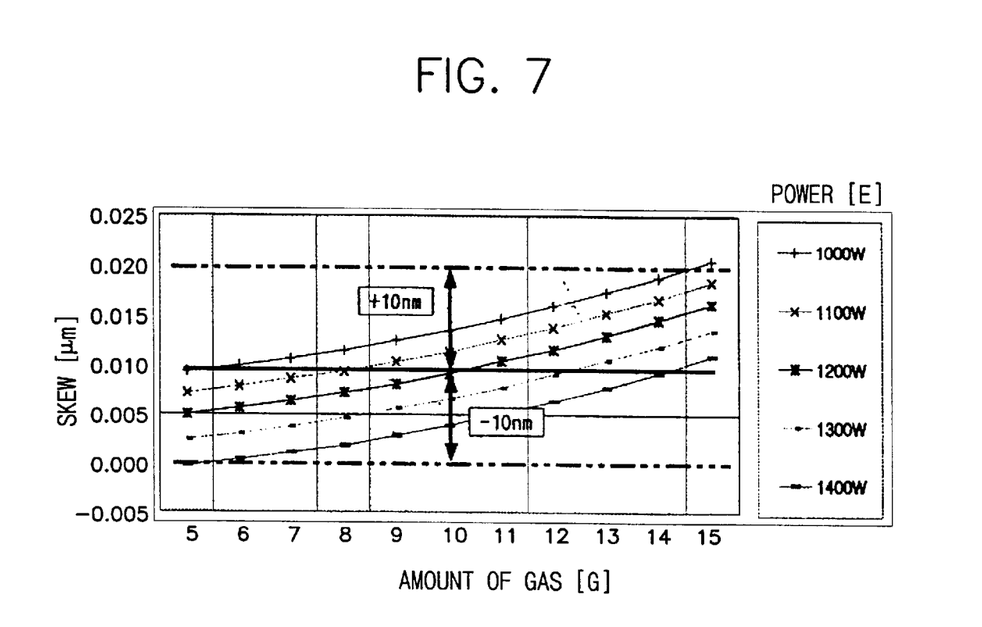
FIG. 7 is a graph for showing a function that is used in determining the process condition of the succeeding process in the second preferred embodiment of the present invention.

FIG. 7 is a graph for showing the variation of the average value of the CD skews obtained when the parameters E and G are varied using the function. The graph shows that the function values of the two parameters E and G are linear. In the graph shown in FIG. 7, when the amount G of gas is fixed, the electric power P reduces from 1400 W to 1000 W to increase the average value of the CD skew by 10 nm. Further, when the amount G of the gas reduces from 14 sccm to 5 sccm when the electric power P is fixed to 1200 W, the average value of the CD skew is reduced by 10 nm.

By the function, the following various process conditions can be obtained. Here, assume that the CD target value TG after the photo process is 0.280 μm and, the standard of the product is 0.260 μm (TG−b in FIG. 4) to 0.300 μm (TG+b in FIG. 4), and the control standard is 0.270 μm (TG−a in FIG. 4) to 0.290 μm (TG+a in FIG. 4).

The existing first process condition which has been applied in the etching process can be applied to lots 520 in which the measured CD value M is within the control standard among the lots processed by the photo process. Here, assume that in the first process condition, the electric power E and the amount G of gas are 1200 W and 10 sccm respectively.

With respect to the lots 510b in which the measured CD value M is smaller than the CD target value TG by 0.010 μm, i.e., 0.260 μm≦M<0.270 μm, the second process condition in which the measured CD value M is varied to a value close to the CD target value TG, i.e., M+0.010 μm needs to be applied. In the graph of FIG. 7, one example of the second process condition is to increase the amount G of gas by 15 sccm, and to reduce the electric power to 1000 W.

With respect to the lots 510a in which the measured CD value M is larger than the CD target value TG by 0.010 μm, i.e., 0.290 μm≦M<0.300 μm, the third process condition in which the measured CD value M is varied to a value close to the CD target value TG, i.e., M−0.010 μm needs to be applied. In the graph of FIG. 7, one example of the third process condition is to decrease the amount G of gas by 5 sccm, and to increase the electric power to 1400 W.

Even though the process conditions of the etching process are explained by using only three conditions, the number of the conditions can be increased for more accurate control.

Meanwhile, the lots 525a and 525b in which the measured CD value M does not satisfy the product standard are determined as defective lots, and become lots which need to be reprocessed by the preceding process, if the reprocessing is made possible by the preceding process.

Table 2 shows a most suitable process condition that is applied to the etching process according to the CD value M measured after the photo process. The computer system 100b has the standard information about the processing conditions of the etching process, as shown in Table 2.

TABLE 2

| Measured CD value M | Process condition of the etching process |
| --- | --- |
| TG − b > M | defect or reprocess |
| TG − b ≦ M < TG − a | process condition 2 |
| TG − a ≦ M ≦ TG + a | process condition 1 |
| TG + a < M ≦ TG + b | process condition 3 |
| TG + b < M | defect or reprocess |

It is necessary to prepare standard information about the various process conditions to be applied to the etching process and the program named ADS-II for controlling the process environment of the etching process by selecting the most suitable process condition according to the CD value M measured after the photo process. The prepared standard information and the program are stored in the computer system 100b.

Figure 5:
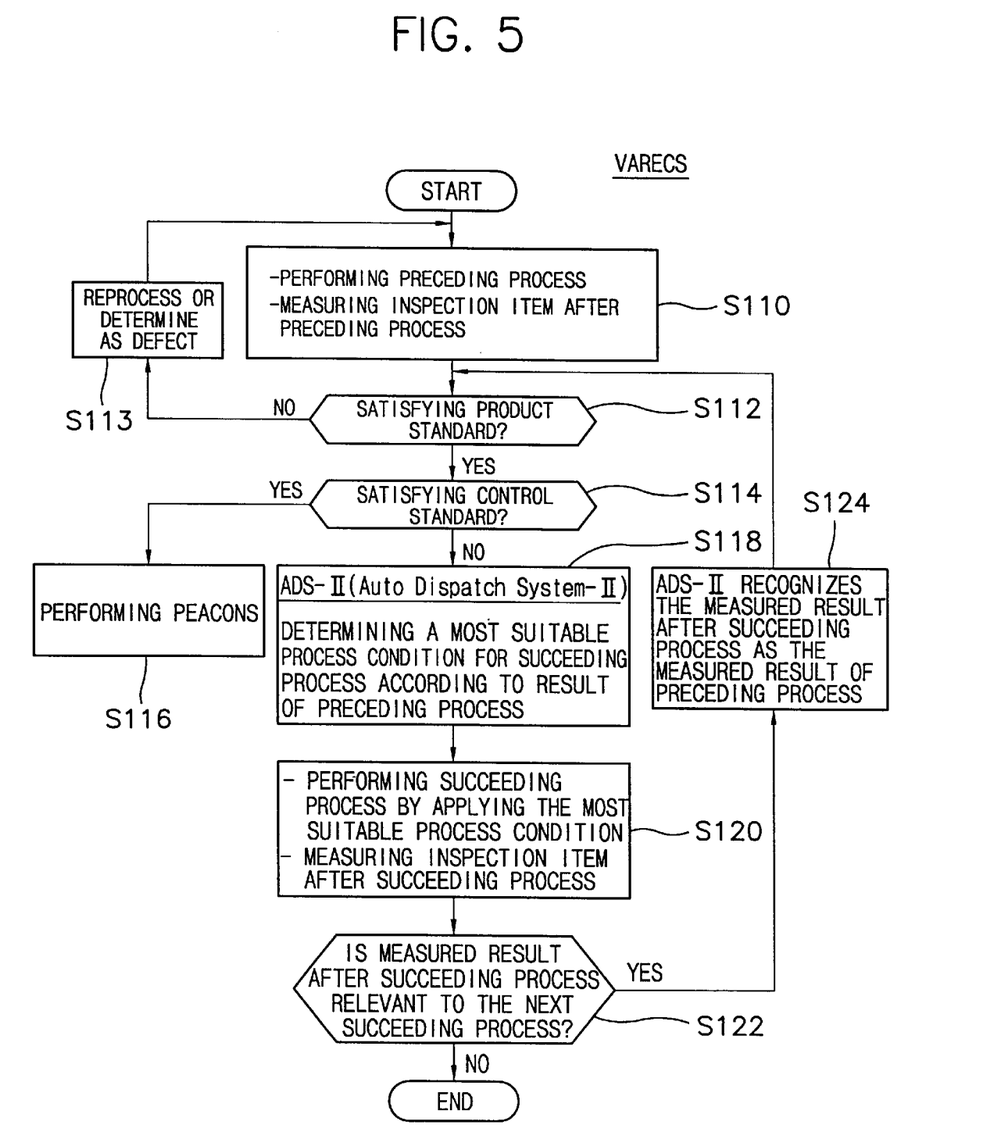
FIG. 5 is a flow chart for dispatching lots by the result of the preceding process by applying the most suitable succeeding process condition according to the lot dispatching system (VARECS) of FIG. 4.

FIG. 5 is a flow chart for dispatching lots by applying the most suitable succeeding process condition according to the result of the processing process using the lot dispatching system (VARECS) of FIG. 4.

Firstly, the preceding process is performed with respect to the lots, the lots are then measured using the inspection equipment 400b for the inspection item determined at the preceding process. For the efficient measuring, the measuring is performed with respect to the sample wafers from the lots. The measured result of the preceding process generally shows a normal distribution curve such as the left-most graph shown in FIG. 4. The inspection item, e.g., the measured data obtained from the measuring is transferred to the computer system 100b together with the identification of the respective lot (Step S110).

The computer system then determines whether the lot satisfies the product standard shown in the standard information of Table 2 (Step S112).

If the product standard is not satisfied, the lot is determined to be defective, and if the reprocessing is possible, determination for reprocessing the lot by the photo process is performed (Step S113).

When the measured result satisfies the control standard, the lot has an error from the CD target value TG that is allowable and the process condition does not need to be changed. But, to reduce small deviations, the lots are dispatched to a suitable etching equipment according to the lot dispatching method (PEACONS) disclosed in the first embodiment of the present invention.

On the other hand, when the measured CD value M of the lot satisfies the product standard but does not satisfy the control standard, the lot is determined by the computer system 100b as the lot to which the second embodiment of the present invention is applied. The computer system 100b selects the second process condition or the third process condition according to the measured CD value M by referring to the standard information stored therein (Step S118).

Thereafter, the computer system controls the etching process equipment for processing a lot dispatched according to the data from the most suitable process condition. And, the etching process is performed with respect to the lot with the most suitable process condition. After the etching process, the measuring of the inspection item is performed for the lot by using the inspection equipment 400b. The inspection item after the etching process is not limited to CD and can be variously set according to the succeeding process following the etching process (Step S120).

This embodiment of the present invention can be applied to the all processes that are related to the semiconductor manufacturing. In this case, the etching process becomes the preceding process with respect to its succeeding process. Thus, the standard information about the pairs of processes that are related to each other is stored in the computer system 100b. The computer system determines whether the results measured from the inspected item after the etching process influences the process result of the succeeding process (Step S122).

After determining that the process result of the etching process influences the succeeding process, e.g., the impurities diffusion process, the computer system 100b stores the measured data transferred from the inspection equipment 400b as the measured data of the preceding impurities diffusion process (Step S124).

According to the second embodiment of the present invention, as shown in the right-most graph of FIG. 4, the number of lots which satisfies the control standard is greater after the etching process than after the photo process. And, the number of lots which fall between the product standard and the control standard is smaller after the etching process than after the photo process. It is because the lots 501a and 510b, which were between the product standard and the control standard, were etched by applying the most suitable process condition corresponding to the photo process result.

(3) A Third Embodiment—Processing Equipment Arrange CONtrol System+Variable Recipe Control System (PEACONS+VARECS)

Figure 6:
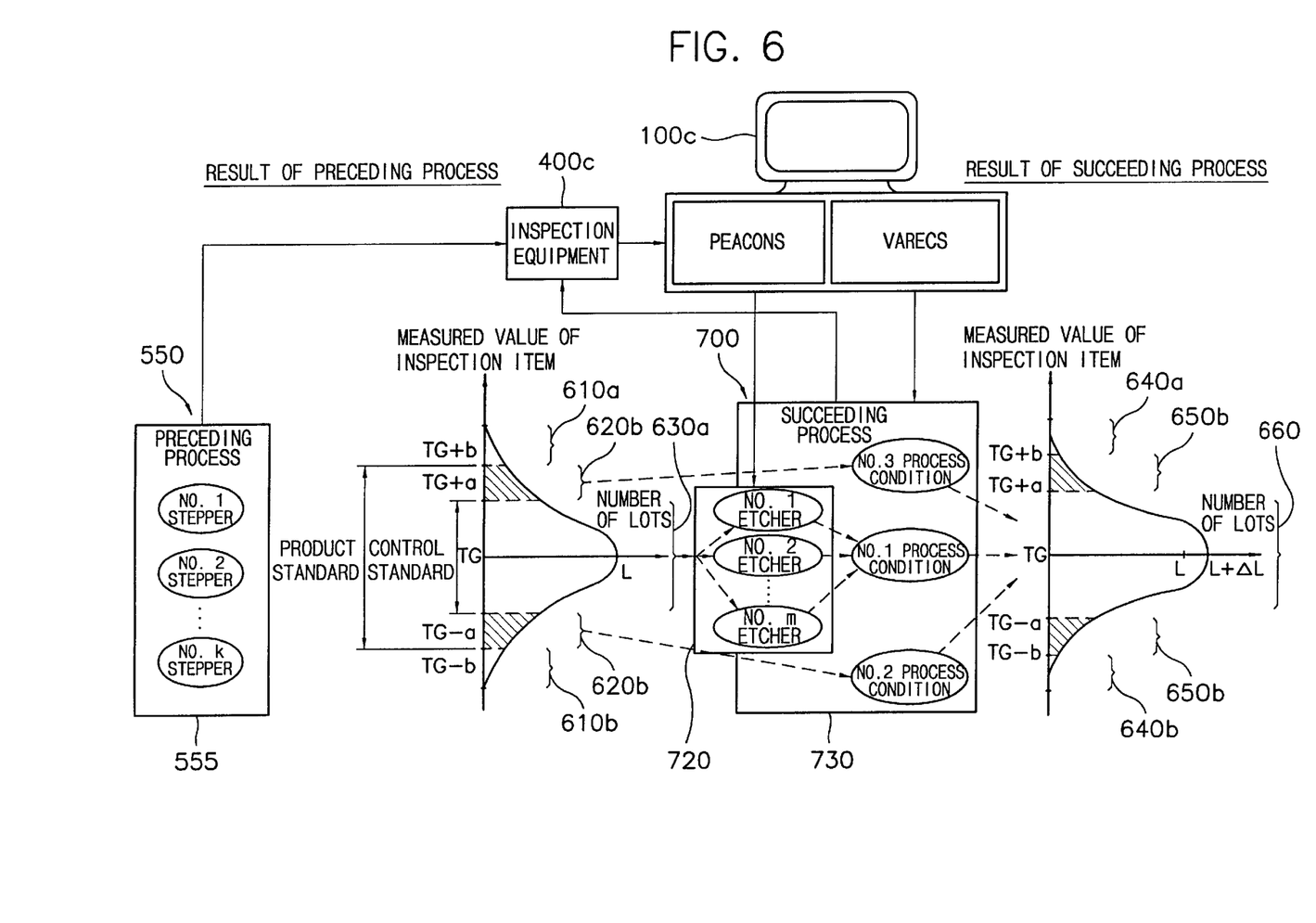
FIG. 6 shows a third preferred embodiment of the present invention and is a view for explaining a concept of a combined lot dispatching system (PEACONS+VARECS) for dispatching lots with the lot dispatching system (PEACONS) of FIG. 2 and the lot dispatching system (VARECS) of FIG. 4 by applying a most suitable processing equipment and a most suitable process condition in performing a succeeding process according to a result of a preceding process.

FIG. 6 schematically shows a structure of a lot dispatching system according to the third embodiment of the present invention. The system integrally applies the lot dispatching system (PEACONS) of FIG. 2 and the lot dispatching system (VARECS) of FIG. 4.

The system includes at least one preceding process equipment, i.e., stepper 555, a plurality of succeeding process equipments, i.e., etchers 720, an inspection equipment 400c for measuring lots which have been processed by the preceding and succeeding processes with respect to the inspection items, and a computer system 100c for controlling a dispatching equipment and a process condition of a succeeding etching process for the lots which have been processed by a preceding photo process by using the measured data of the lots which is transferred from the inspection equipment 400c and by using various standard information. A management program named auto lot dispatching system-III ADS-III that can integrally perform the first and second embodiments is stored in the computer system 100c.

The system dispatches the lots by applying the most suitable process equipment and process condition in performing the succeeding process according to the result of the preceding process. The lot dispatching method according to the system will be easily understood by the skilled in the art, and hereinafter the main characteristics of the method will be briefly explained.

The inspection item is measured by using the inspection equipment 400c with respect to the respective lots that have been processed by the photo process. The measured result is transferred to the computer system 100c. The computer system 100c sorts the lots 610a and 610b as lots which do not satisfy the product standard, the lots 620a and 620b as lots which satisfy the product standard but do not satisfy the control standard, and the lots 630a as a lot which satisfies the control standard.

According to the result of the sorting, the computer system 100c determines the lots 610a and 610b as defects, and determines reprocessibility of the lots if the reprocessing is possible. A determination is made that lots 620a and 620b can be handled with the dispatching method (VARECS) according to the second embodiment, and are processed in the step S118 of FIG. 5 and its succeeding steps. And, a determination is made that lots 630a can be handled with the dispatching method (PEACONS) according to the first embodiment, and are processed in the step S50 of FIG. 3 and its succeeding steps.

Although the preferred embodiments of the present invention have been described, the present invention should not be limited to these preferred embodiments, but various changes can be made within the scope of the present invention. For example, the combination of the preceding and succeeding processes can vary in the semiconductor manufacturing process. And, the succeeding process may not be right after the preceding process, and a plurality of inspection items can be selected.

According to the result in which the first preferred embodiment of the present invention is applied to the photo and etching processes, the process capability (Cpk) after the etching process is markedly improved. The degree of improvement for the process capability increased as the applying rate increased. For example, the process capability increased by 0.07 when the applying rate was 56%, and increased by 0.2 when the applying rate was 95%. Further, according to the result in which the second embodiment is applied, the process capability increased by 0.3, and the deviation rate with respect to the product standard decreased by 6.2%. For reference, the process capability (Cpk) indicates the quality (the magnitude of the quality dispersion) of the lot which is processed in the respective process, and is defined as follows.

$$Cpk = D/3\sigma \qquad (6)$$

where the parameter D is the distance between the process average of the inspection item and the product standard limit and $\sigma$ is the average deviation of the inspection item.

As a result of the improvement in the process capability, the incongruence rate and the scrap generation rate of the lots are markedly reduced, and due to the resulting increase in productivity, a significant decrease in manufacturing time and cost can be realized. The present invention can be applied to the overall semiconductor manufacturing process, which results in synergy effects.

As stated above, preferred embodiments of the present invention are shown and described. Although the preferred embodiments of the present invention have been described, it is understood that the present invention should not be limited to these preferred embodiments, but various changes and modifications can be made by one skilled in the art within the spirit and scope of the present invention as hereinafter claimed.

What is claimed is:

1. A lot dispatching method for dispatching a first lot which has been processed by a first processing equipment using a first process to a second process that is subsequent to the first process and in which a plurality of second processing equipment is operated in parallel, comprising:

storing in a computer system measured data of an inspection item of a second lot processed prior to the first lot by the first processing equipment and measured data of the inspection item of the second lot processed by one of the second processing equipment;

evaluating process capabilities of the second processing equipment to compensate deviations of the inspection item from a target value with respect to the first lot to the target value of the inspection item based on accumulated measured data, the deviations being generated by the first processing equipment;

determining a dispatching order of the first lot to the plurality of second processing equipment according to the evaluated process capabilities evaluated by the computer system; and dispatching the first lot to an available one of the second processing equipment that is designated by the dispatching order.

2. The lot dispatching method according to claim 1, further comprising:

measuring respective inspection items of a lot respectively processed by the first and second processing equipment; and transferring measured data obtained from the respective inspection items during said measuring to the computer system and updating existing data stored in the computer system.

3. The lot dispatching method according to claim 1, wherein the process capabilities of the second processing equipment are represented by a span of the inspection item, wherein $$span = A - (R + TG),$$

and the dispatching order is determined by absolute values of the span, wherein a relatively low absolute value of the span is given priority, wherein A is a measured value of the inspection item of the first lot, TG is the target value of the inspection item of the second process, and R is a latest representative value of skews generated by each pair of processing equipment that is comprised of a first processing equipment and a second processing equipment, the skews being deviation values between a measured value of the inspection item after the first process and a measured value of the inspection item after the second process with respect to an identical lot.

4. The lot dispatching method according to claim 3, wherein the latest representative value R of skews is a mean value or an average value of the skews.

5. The lot dispatching method according to claim 1, further comprising checking whether a measured value of the first lot with respect to the inspection item satisfies a control standard to judge whether the first lot is to be handled in accordance with the lot dispatching method, wherein a product standard is an external standard for judging whether a lot is defective or non-defective with respect to product quality, the control standard being set more strictly than the product standard.

6. A lot dispatching method for dispatching first lots which have been processed by a first process in which a plurality of first processing equipment are simultaneously operated to a second process that is subsequent to the first process and in which a plurality of second processing equipment are simultaneously operated, comprising:

measuring respective inspection items of lots respectively processed by the first and second processing equipment;

calculating skews of the inspection items which are deviation values between measured values of the inspection item after the first process and measured values of the inspection item after the second process with respect to an identical lot, the deviation values being generated by a plurality of pairs of processing equipment that is comprised of one of the first processing equipment and one of the second processing equipment, based on measured data of said measuring;

determining a span of respective pairs of processing equipment wherein $$span = A - (R + TG),$$

wherein A is a measured value of the inspection item of the first lots, TG is a target value of the inspection item of the second process, and R is a latest representative value of skews generated by each pair of processing equipment;

determining a dispatching order of respective second processing equipment which are paired with one of the first processing equipment which has processed the first lots, wherein the dispatching order is determined by absolute values of the spans, wherein a relatively low absolute value of the span is given priority; and dispatching respective first lots to a second processing equipment according to the dispatching order.

7. The lot dispatching method according to claim 6, wherein the latest representative value R of skews is a mean value or an average value of the skews.

8. The lot dispatching method according to claim 6, further comprising checking whether the measured value of respective first lots with respect to the inspection item satisfies a control standard to judge whether the first lots are to be handled in accordance with the lot dispatching method, wherein a product standard is an external standard for judging whether a lot is defective or non-defective with respect to product quality, the control standard being set more strictly than the product standard.

9. The lot dispatching method according to claim 6, wherein when the second processing equipment designated by the dispatching order is not available, respective first lots are dispatched to another second processing equipment with a next highest priority as designated by the dispatching order.

10. The lot dispatching method according to claim 6, wherein the inspection item is one or more quality inspection items used in semiconductor device manufacturing processes including critical dimension, line width, thickness of a thin film, reflection rate, and insulation characteristics.

11. A lot dispatching method for dispatching current lots, in a semiconductor integrated circuit device manufacturing process having at least a first process and a second process that is subsequent to the first process, comprising:

classifying values of an inspection item into several groups according to magnitude and preparing a plurality of process conditions for the second process, each of the processing conditions corresponding to a respective one of the several groups, wherein the process conditions have compensating characteristics to minimize a difference between a standard value of a group corresponding to a process condition and a target value of the inspection item;

measuring the inspection item with respect to the current lots after the first process;

selecting one of the process conditions corresponding to a measured value obtained during said measuring; and dispatching the current lots to the second process and setting the second process to a selected process condition.

12. The lot dispatching method according to claim 11, further comprising selecting for handling in accordance with the lot dispatching method an object lot from the current lots processed by the first process in which a measured value of the inspection item satisfies a product standard but does not satisfy a control standard, wherein the product standard is a criteria for judging whether a lot is defective or non-defective with respect to product quality, the control standard being set more strictly than the product standard.

13. The lot dispatching method according to claim 11, wherein the plurality of process conditions are determined by selecting at least one process condition element which influences a process result with respect to the inspection item from among process condition elements of the second process; determining a function for regulating values of the inspection item, the selected process condition elements being parameters of the function; determining values of the parameters for compensating the differences corresponding to respective groups; and setting the values of the parameters as values of the process condition elements.

14. The lot dispatching method according to claim 13, wherein the process condition elements which are parameters of the function are selected from a plurality of process condition elements by which dispersion characteristics of the measured value with respect to the inspection item are obtained within a predetermined reference range.

15. The lot dispatching method according to claim 13, wherein the function is substantially linear with respect to the parameters.

16. A lot dispatching method for dispatching a current lot which has been processed by a first processing equipment using a first process to a second process that is subsequent to the first process and in which a plurality of second processing equipment are simultaneously operated, comprising:

measuring an inspection item of lots processed by the first processing equipment and an inspection item of lots processed by a second processing equipment;

classifying values of the inspection item into several groups according to magnitude and preparing a plurality of process conditions for the second process, wherein the process conditions have compensating characteristics which minimize a difference between a standard value of a group corresponding to each of the process conditions and a target value of the inspection item;

determining whether a measured value of the inspection item of the current lot corresponds to a first case in which the measured value satisfies a product standard but does not satisfy a control standard that is set more strictly than the product standard or corresponds to a second case in which the measured value satisfies the control standard;

selecting one of the process conditions based on the measured value of the inspection item of the current lot, dispatching the current lot to the selected second process and setting the second process to the selected process condition, if the current lot is determined to correspond to the first case; and dispatching the current lot to a second processing equipment which compensates deviations of the inspection item from the target value of the inspection item to a smallest value if the current lot is determined to correspond to the second case, wherein the deviations are generated by the first processing equipment with respect to the current lot.

17. The lot dispatching method according to claim 16, wherein the dispatching of the current lot to a second processing equipment comprises:

storing measured data of the inspection item of prior lots processed prior to the current lot by the first processing equipment and measured data of the inspection item of the prior lots processed by one of the second processing equipment;

evaluating a process capability of each of the second processing equipment to compensate the deviation of the inspection item from the target value of the inspection item, as generated by the first processing equipment with respect to the current lot, to the target value of the inspection item;

determining a dispatching order of the current lot with respect to the plurality of second processing equipment according to the evaluated process capability; and dispatching the current lot to an available one of the second processing equipment which is designated by the dispatching order.

18. The lot dispatching method according to claim 17, wherein if the second processing equipment designated by the dispatching order is not available, the current lot is dispatched to another second processing equipment having a next highest priority as designated by the dispatching order.

19. The lot dispatching method according to claim 17, wherein the process capability of the second processing equipment is represented by a span of the inspection item wherein $$span = A - (R + TG),$$

wherein A is a measured value of the inspection item of the current lot, TG is a target value of the inspection item in the second process, and R is a latest representative value of skews generated by each pair of processing equipment that is comprised of the first and second processing equipment, the skews being deviation values between a measured value of the inspection item after the first process and a measured value of the inspection item after the second process with respect to an identical lot, the dispatching order being determined by absolute values of the span wherein a relatively low absolute value of the span is given priority.

20. The lot dispatching method according to claim 19, wherein the latest representative value of skews R is a mean value or an average value of the skews.

21. The lot dispatching method according to claim 16, wherein the plurality of process conditions are determined by selecting at least one process condition element which influences a variation of a process result with respect to the inspection item from among process condition elements which determine the process condition of the second process; determining a function equation which can regulate the value of the inspection item, the selected process condition elements being parameters; determining values of the parameters which compensate error corresponding to the respective group; and setting the value of the parameters to a value of the process condition element.

22. The lot dispatching method according to claim 21, wherein the function equation is substantially linear with respect to the parameters.

23. A lot dispatching system for dispatching a first lot that has been processed by a first process to a second process in a semiconductor integrated circuit device manufacturing process having at least the first process and the second process that is subsequent to the first process, comprising:

a first stage having a plurality of first equipment that are the same and that perform the first process on a second lot;

a second stage having a plurality of second equipment that are the same and that perform the second process on the second lot;

a measuring unit that measures an inspection item with respect to a lot processed by the first and second processes; and a controller that stores the measured data transferred from said measuring unit, that evaluates a process capability of each of the second processing equipment to compensate a deviation of the inspection item from a target value of the inspection item with respect to the first lot, that determines a dispatching order of the first lot to the second processing equipment according to the evaluated process capability, and that controls a dispatching process of the first lot to an available one of the second processing equipment which is designated by the dispatching order, the deviation of the inspection item being generated by the first processing equipment.

24. The lot dispatching system according to claim 23, wherein the process capability of the second processing equipment is represented by a span of the inspection item that is determined by said controller wherein $$span = A - (R + TG),$$

wherein A is a measured value of the inspection item of a current lot, TG is a target value of the inspection item of the second process, and R is a latest representative value of skews generated by each pair of processing equipment that is comprised of a first processing equipment and a second processing equipment, the skews being deviation values between a measured value of the inspection item after the first process and a measured value of the inspection item after the second process with respect to an identical lot, the dispatching order being determined by absolute values of the span wherein a relatively low absolute value of the span is given priority.

25. A lot dispatching system for dispatching a current lot which has been processed by a first process to a second process in a semiconductor integrated circuit device manufacturing process, the second process being performed after the first process, comprising:

a measuring unit that measures an inspection item of the current lot;

first processing equipment that performs the first process on the current lot;

second processing equipment that performs the second process on the current lot; and a controller that classifies values of the inspection item into a plurality of groups according to magnitude, that prepares a plurality of process conditions corresponding to the groups for the second process, the process conditions having compensating characteristics which minimize a difference between a standard value of a group corresponding to a process condition and a target value of the inspection item, that selects a process condition from among the process conditions based on a magnitude of measured data transferred from said measuring unit, and that dispatches the current lot to the second process and sets the second process to the selected process condition.

26. The lot dispatching system according to claim 25, wherein the plurality of process conditions are determined by selecting one or more process condition elements from among the process conditions of the second process which have influence on varying a process result with respect to the inspection item, by determining a function having the selected process condition elements as parameters thereof for regulating the process result of the inspection item, by determining values of the parameters which compensate the difference corresponding to a respective group, and by setting the values of the parameters to the values of the process condition elements.

27. A lot dispatching system for dispatching a first lot which has been processed by a first process to a second process that is subsequent to the first process in a semiconductor integrated circuit device manufacturing process, comprising:

a first stage having at least one first processing equipment that are the same and that perform the first process on a second lot;

a second stage having a plurality of second processing equipment that are the same and that perform the second process on the second lots;

a measuring unit that measures an inspection item of lots processed by the first and second processes; and a controller that stores measured data received from said measuring unit, classifies values of the inspection item into a plurality of groups according to magnitude, prepares a plurality of process conditions corresponding to the groups for the second process, wherein the process conditions have compensating characteristics which minimize a difference between a standard value of the groups corresponding to a process condition and a target value of the inspection item, judges whether a measured value of the inspection item of the first lot corresponds to a first case wherein the measured value satisfies a product standard but does not satisfy a control standard which is set more strictly than the product standard or corresponds to a second case wherein the measured value satisfies the control standard, evaluates process capabilities of the second processing equipment to compensate a deviation of the first lot from the target value as generated by said first processing equipment with respect to the target value of the inspection item according to the stored measured data, when the measured value of the inspection item of the first lot is judged to correspond to the second case, determines a dispatching order of the first lot with respect to the plurality of second processing equipment according to the evaluated process capabilities, dispatches the first lot to an available one of the second processing equipment which is designated by the dispatching order, and selects one process condition from among the plurality of process conditions based on magnitude of the measured data transferred from said measuring unit, dispatches the first lot to the second process and sets the second process to the selected process condition, when the measured value of the inspection item of the first lot is judged to correspond to the first case.

* * * * *